(12) United States Patent
Du et al.

(10) Patent No.: US 11,847,166 B2
(45) Date of Patent: Dec. 19, 2023

(54) SEARCH ENGINE FUNCTIONALITY USING SHARED AI MODELS

(71) Applicant: MICROSOFT TECHNOLOGY LICENSING, LLC, Redmond, WA (US)

(72) Inventors: Liang Du, Redmond, WA (US); Ranjith Narayanan, Bellevue, WA (US); Robin Abraham, Redmond, WA (US); Vijay Mital, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 516 days.

(21) Appl. No.: 16/192,690

(22) Filed: Nov. 15, 2018

(65) Prior Publication Data

US 2020/0159868 A1     May 21, 2020

(51) Int. Cl.
*G06F 16/30* (2019.01)
*G06F 16/9032* (2019.01)
*G06F 9/451* (2018.01)
*G06F 16/9038* (2019.01)
*G06F 16/31* (2019.01)
*G06N 20/00* (2019.01)

(52) U.S. Cl.
CPC ........ *G06F 16/90328* (2019.01); *G06F 9/451* (2018.02); *G06F 16/313* (2019.01); *G06F 16/9038* (2019.01); *G06N 20/00* (2019.01)

(58) Field of Classification Search
CPC ........... G06F 16/90328; G06F 16/9038; G06F 16/313; G06F 16/451; G06F 16/951; G06F 9/451; G06F 16/3338; G06F 16/332; G06N 20/00
See application file for complete search history.

(56) References Cited

U.S. PATENT DOCUMENTS

2007/0073697 A1   3/2007   Woods
2014/0074811 A1*   3/2014   Wang .................... G06F 16/951
                                                                   707/706

(Continued)

FOREIGN PATENT DOCUMENTS

CA            2747145 A1     1/2013
WO       2014039738 A1     3/2014

OTHER PUBLICATIONS

"International Search Report and Written Opinion Issued in PCT Application No. PCT/US19/060170", dated Mar. 25, 2020, 11 Pages. (MS# 405341-WO-PCT).

(Continued)

*Primary Examiner* — Tyler J Torgrimson
(74) *Attorney, Agent, or Firm* — WORKMAN NYDEGGER

(57) ABSTRACT

Performing collaborative search engine searching. The method includes receiving user input at a user interface for performing a plurality searches on a first search engine. The method further includes receiving user input at the user interface applying one or more augmentation AI models to searches in the plurality of searches. The method further includes creating a shareable, executable package executable by one or more search engines based on the plurality of searches and the applied AI models that when executed by the search engines causes the search engines to apply the AI models to searches performed at the search engines.

20 Claims, 4 Drawing Sheets

(56) References Cited

U.S. PATENT DOCUMENTS

2017/0213156 A1\* 7/2017 Hammond .............. G06F 30/20
2018/0114111 A1\* 4/2018 Gill ........................ G06N 3/004
2018/0307945 A1\* 10/2018 Haigh .................... G06N 3/063
2019/0354599 A1\* 11/2019 Mital ..................... G06N 20/00

OTHER PUBLICATIONS

"Office Action Issued in Indian Patent Application No. 202117021086", dated Jan. 17, 2023, 7 Pages.

\* cited by examiner

SEARCH ENGINE FUNCTIONALITY USING SHARED AI MODELS

BACKGROUND

Background and Relevant Art

Search scientists often possess particular skills and experience. These skills and experience are often very personal in nature such that different searchers searching the same subject matter will often obtain different search results or incomparable search results. For example, consider the case where two different researchers are searching different data sets, but studying similar topics. While there would be some differences in results obtained due to different data sets being used, the research differences would be exacerbated by the fact that the searchers use different search strategies and techniques. Thus, results obtained by different searchers on different data sets could not be directly compared. This may be further exacerbated by the fact that the different searches may use tools that are different. In particular, different search engines and associated tools will analyze data differently thus creating different results that are not directly comparable. Thus, there is a technical problem where the tools used by different research scientists are different, such that different, non-directly comparable results are obtained by these tools.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method for performing collaborative search engine searching. The method includes receiving user input at a user interface for performing a plurality searches on a first search engine. The method further includes receiving user input at the user interface applying one or more augmentation AI models to searches in the plurality of searches. The method further includes creating a shareable, executable package executable by one or more search engines based on the plurality of searches and the applied AI models that when executed by the search engines causes the search engines to apply the AI models to searches performed at the search engines.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
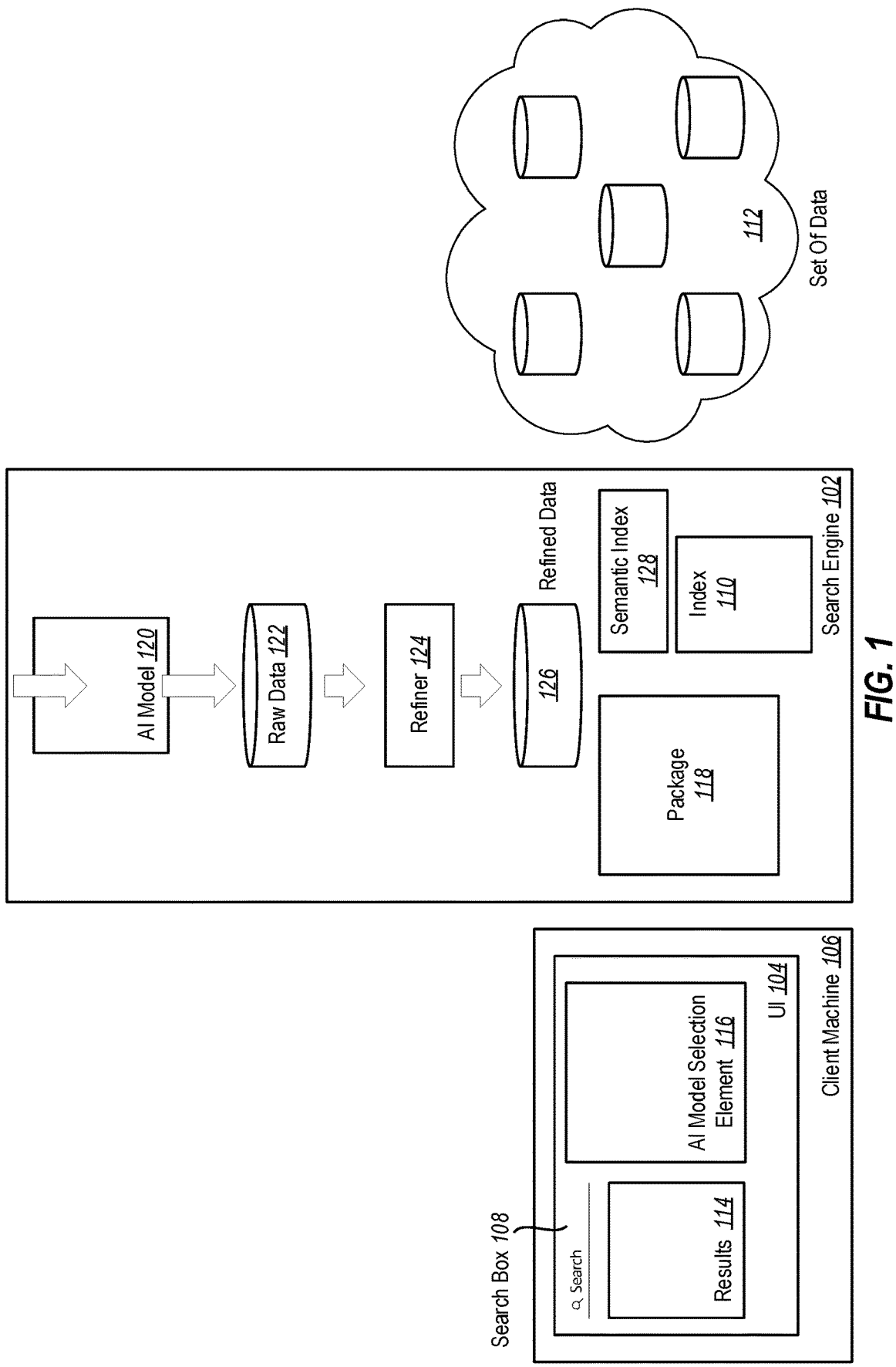
FIG. 1 illustrates a system for creating and exporting AI facilitated searching into search packages.

Embodiments illustrated herein allow searchers to share their search strategies, search knowledge, and/or search tools by sharing executable packages that can be executed by search engines to implement the strategies, knowledge, and/or tools. This can allow searchers to easily replicate searches performed by other searchers. The searches can be replicated on a same data set or search engine, for example, to verify results, can be performed on different data sets or search engines, or can be performed on updated data sets or updated search engines to replicate searches on different systems or to update searches on updated systems.

Note that, in some embodiments, the shared executable packages will include searches to be performed on a search engine as well as AI models to be applied to searches. Thus, specialized searches can be performed that include expanded search results made possible by application of AI models as illustrated in more detail below.

Note that the AI models illustrated herein are generally augmentation AI models. An augmentation AI model takes as input certain data, and in particular, human consumable data. An augmentation AI model produces data that augments the input data according to a predetermined augmentation goal of the augmentation AI model. That is, the augmentation AI model attempts to produce a certain type of augmentation data (as defined by the goal of the AI model) that is related to the input data, usually by providing additional data about individual pieces of input data or groups of pieces of data, where, at least a portion of that additional data was not previously included in the input data, but can be interpreted, rearranged, inferred, deduced, and/or speculated from the input data.

In some embodiments, the augmentation data is produced by aggregating aspects of several of the individual pieces of data in the input data to identify significant classifiable aspects, and then using those classifiable aspects to generate augmentation data for individual pieces of data and/or specific groups of individual pieces of data.

Certain semantics are preserved based on the goal of the AI model. These semantics can be used to search the generated augmentation data to identify augmentation data results, that can be used to identify data in the input data that correlates to the results from the search of the augmentation data.

Applying an AI model generates additional data about search results. This additional data can be filtered and semantically indexed for additional searching. In particular, an AI model is a model of a particular type and/or sub-type as defined by the goal of the AI model. The additional data generated by applying an AI model is semantically consistent with the goal of the AI model and is indexed where index keys (i.e., the terms and/or concepts to be searched in the index) are semantically indexed such that the index keys are directly related to the index type and/or sub-type. As the goal of the AI model in this particular example is style recognition, the additional data is semantically indexed for style recognition to allow the additional data to be searched for that purpose.

As discussed previously, augmentation AI models may be used with embodiments of the invention illustrated herein. Augmentation AI models produce additional data that augments input data as discussed above. The following illustrates a number of examples of augmentation AI models. Note that these different types of augmentation models may have some overlap and/or may be used together to accomplish some goal.

One type of augmentation AI model is classification models. Classification models have the goal of classifying data in input data. For example, a classification model could classify data as representing an animal, a person, a color, a style, or virtually any other classification.

Another type of augmentation AI model is detection models. Detection model have the goal of detecting certain characteristics in data. For example, an image recognition model may have a goal of detecting humans in images.

Another type of augmentation AI model is a scene recognition models. Scene recognition models have a goal of detecting specific instances in data. For example, while a detection model may detect a human generally, a scene recognition model may have a goal to detect a specific human.

Another type of augmentation AI model is localization models. Localization models have a goal of detecting details regarding time and space. For example, a localization model may have a goal of identifying a specific location or time that is relevant to data. For example, a localization model may be able to use features in a photograph to determine (within some probability and/or range) where and when the photograph was taken.

Another type of augmentation AI model is similarity/dissimilarity models. Similarity/dissimilarity models have the goal of identifying similarities and/or differences in different pieces of data. For example, a dissimilarity model may have a goal of determining when a particular individual is missing in a photograph, from among a set of photographs.

Another type of augmentation AI model is associative models. Associative models have the goal of identifying when different pieces of data are related. For example, an associative AI model may have the goal of determining what items typically occur together. Such a model could be used to identify when an item is missing.

Another type of augmentation AI model is prediction models. Prediction models have the goal of identifying data that might exist. For example, a prediction model may have a goal of determining what is likely to occur next in time based on a scene in a still photograph. Alternatively or additionally, a prediction model could have the goal of predicting what is behind an object in a still photograph.

Another type of augmentation AI model is summary models. Summary models have the goal of summarizing information from different pieces of data.

Another type of augmentation AI model is transformative models. Transformative models have the goal of changing data according to some predetermined characteristic. For example, a particular transformative model may have the goal of changing an image to a Van Gogh style painting, where Van Gogh style is the characteristic.

Referring now to FIG. 1 an example embodiment is illustrated. The embodiment illustrated in FIG. 1 shows a search engine 102. The search engine 102 includes computer hardware and software configured to perform searches on behalf of a client using a user interface 104. In particular, the user interface 104 is generally caused to be displayed by the search engine 102 at a client machine 106. Typically, the client machine 106 is at a remote location as compared to the search engine 102. Nonetheless, the search engine 102 renders the user interface 104 at the client machine 106 using various communications and algorithmic actions. A user at the client machine 106 can enter into a search box 108 various search terms. The search terms are provided to the search engine 102. The search engine 102 uses an index 110 to match search terms, operators (such as AND, XOR, OR, etc.), and/or filters (such as time filters, location filters, etc.) entered into the search box 108 to entries in the index 110.

The index 110 stores a correlation of index entries to endpoints storing data. In particular, the index 110 indexes a set of data 112. The set of data 112 may include a number of different data stores and data sets stored in many different locations. For example, many consumer-based search engines use an index which indexes data from a variety of sources and stored at data stores around the world. Thus, the set of data 112 can be nearly unlimited in its scope. The index 110 stores various keywords, or other information, correlated to endpoints where data is stored in the set of data 112. The index 110 will return results to the user interface 104 identifying the endpoints where a user can obtain the data relevant to the search terms entered into the search box 108. Often, the results include portions, or all, of the data from the endpoints.

At the user interface 104, the user can select various links provided by the index 110 to navigate to a data source endpoint having data of interest. In some embodiments, the search results themselves may be the relevant results without need for navigating to a different data source. In some such embodiments, search results will not link to other data sources, but rather, are the relevant data. In alternative embodiments, the search results are the relevant data, but may nonetheless include links to related data or a data source where the relevant data can be found.

Once a user has visited or marked relevant search results from the returned results 114, during the same session, the user may perform additional searches by typing additional search terms in the search box 108 to view yet additional search results based on the additional searches.

The search engine 102 may have more or one or more AI models applied by the user at the user interface 104. For example, FIG. 1 illustrates an AI model selection element 116 where a user can select one or more particular AI models to apply to a search session. The AI model 120 is implemented on the search engine 102 using hardware and software at the search engine 102. While a single AI model is illustrated, it should be appreciated that in other embodiments, multiple AI models may be implemented.

The AI model 120 takes as input any relevant data. In some embodiments, such data may be data returned from a search using the index 110 on the set of data 112 prior to AI models.

The AI model 120 operates on the various input to create raw data 122. The raw data 122 is passed through a refiner 124 to produce refined data 126. The refined data 126 can be indexed to create a semantic index 128. The semantic index 128 is able to be searched by the search engine 102. This allows for additional results to be obtained that can be used to filter, summarize or otherwise modify the results that are displayed in the results interface 114 (or in other interface elements as appropriate). The returned results displayed in the results interface 114 from searching the semantic index 128 may be data in the refined data 126, or additionally or alternatively may be data from the set of data 112 correlated to the returned results. Thus, for example, the refined data 126 may identify data in the set of data 112, or data in previously returned results, having styles. If a new search is for a particular style, data from the set of data 112 or from previous search results can be identified as having the particular style, such that the data from the set of data 112 or data from previous search results can be returned as results of searching the refined data (which correlates to the set of data 112, search result data, or other data).

In this way, available results are extended by the search engine 102 by identifying AI models that can be implemented to increase the available data (including data relationships) that can be searched by the search engine 102. In some embodiments, the refined data 126 is added to the set of data 112, and the index 110 is expanded to include the semantic index 128 allowing the search engine 102 to search across both existing data, as well as data created by applying AI models.

As noted above, when input datasets are operated on by AI models, raw data is produced. The raw data includes a large amount of produced data, much of which will not typically be of interest to a user. Thus, some embodiments may refine the raw data into a refined data structure that can be used by the search engine 102. In some embodiments, a refiner computing entity, such as the refiner 124 discussed above, may be used to perform this functionality. The refinement may involve the refiner 124 truncating, converting, combining, and/or otherwise transforming portions of the AI model output. The refinement may involve the refiner 124 prioritizing portions of the output by perhaps ordering or ranking the output, tagging portions of the AI model output, and so forth. There may be a different refinement specified for each AI model or model type. There may even be a different refinement specified for each model/data combination including an AI model or model type with an associated input dataset or input dataset type. Upon obtaining output data from the AI model, the appropriate refinement may then be applied. The refinement may cause the refiner to bring forth, for instance, what a typical user would find most relevant from a given AI model applied on given data. The actually performed refinement may be augmented or modified by hints specific to an AI model and/or by learned data.

As an illustrative example, certain types of AI models are typically used to try and produce certain types of data. Thus, data that is produced in the raw output data that is not of the type typically evaluated when using a particular AI model may be removed to create refined data.

In some embodiments, the refined data may then be semantically indexed to provide a semantic index (such as semantic index 128) that may then be queried upon by a user. Semantic indexing, and the corresponding retrieval methods used by the search engine 102, are directed to identifying patterns and relationships in data. For example, some embodiments implementing semantic indexing can identify relationships between terms and concepts that are present in otherwise unstructured data. Thus, a semantic indexer may be able to take a set of unstructured data and identify various latent relationships between data elements in the unstructured data. In this way, a semantic indexer can identify expressions of similar concepts even though those expressions may use different language to express the same concepts. This allows data to be indexed semantically as opposed to merely indexing data based on element wise similarity.

A characterization structure might also include a set of one or more operators and/or terms that a query engine may use to query against the semantic index. By providing those operators and/or terms to a query engine, such as the search engine 102, the user may more effectively use that query engine to extract desired information from the semantic index.

The characterization structure might also include a set of one or more visualizations that a visualization engine may use to visualize to a user's responses to queries using the semantic index. Such visualizations may be those that for the given semantic index, most effectively and intuitively represent the output of a query to a user. Thus, the characterization structure may also provide mechanisms to effectively interface with a semantic index generated from the refined output of the AI model. The characterization structure may be easily expanded as new AI model and/or dataset types become available.

The refinement may also be based on hints associated with that AI model, and/or learned behavior regarding how that AI model is typically used. The obtained results are then refined using the determined refinement. It is then these more relevant refined results that are semantically indexed to generate the semantic index 128.

In some embodiments, feedback provided to the user is based on new semantics added into a semantic space. In particular, the search engine 102, which is a computer implemented processor that includes data processors and data analyzers, along with a graphical user interface, is able to identify what words are added to a new or existing semantic space. These may have been added as the result of the user adding new data sources to the search engine 102 and/or the result of adding new AI models to a search or search session.

Note that while a specific user interface is illustrated, it should be appreciated that other types of interfaces could be used. For example, in some embodiments, an e-commerce website may be part of the user interface of a search engine.

Figure 2:
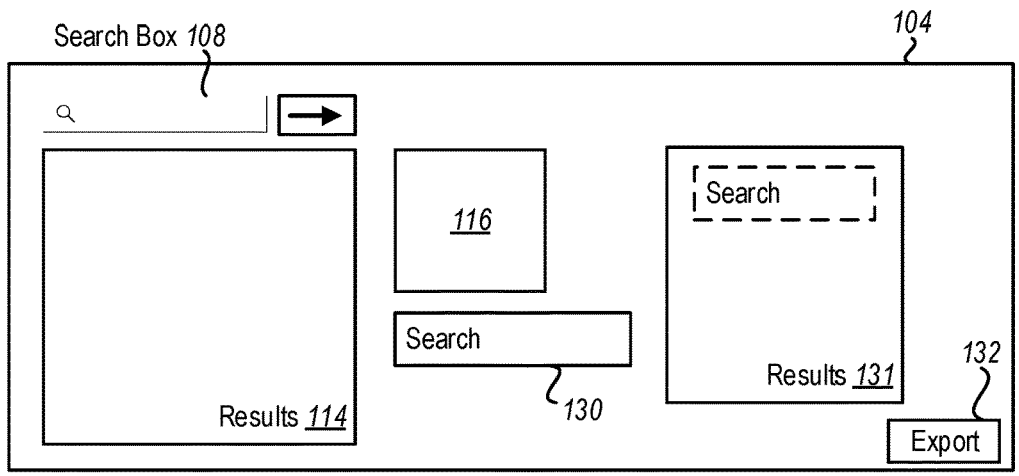
FIG. 2 illustrates a user interface used for exporting AI facilitated searching into search packages.

Referring now to FIG. 2 an example is illustrated. FIG. 2 illustrates a user interface 104 displayed by a search engine 110. In the particular user interface 104, the user interface 104 includes a search box 108. In the search box 108, the user can enter various search terms, operators (such as OR, AND, XOR etc.), filters (such as filters based on dates, websites, locations, language, formats, etc.) and other search parameters. The search engine 102 will perform a search of various databases and/or other data stores as appropriate. The search engine 102 will return results 114 in the user interface 104. These results 114 may be typical results a user might expect when searching using a search engine. In alternative embodiments, additional results based on adding AI models may be displayed in the results 114, as explained in more detail below.

The search engine illustrated allows a user to add artificial intelligence (AI) models using the search engine user interface 104 to cause the AI models to be applied to the search session. For example, FIG. 1 illustrates that an AI model 120 (see FIG. 1) is added using the AI model selection element 116 in the user interface 104. The search engine 102 will apply the AI model 120 to the search session. For example, as will be illustrated below, often the AI models are applied to the results, from one or more previous searches, to create additional data which can be searched. For example, an AI model may analyze results to identify results having certain grammar styles, visual styles, scientific fields, summarization of results analyses, or other information.

The user can then perform one or more additional searches illustrated at 130 on this additional data created by the AI model 120. For example, a user may request all results exhibiting Baroque style. This is made possible because, in the illustrated example, the AI model 120 analyzes the results to identify various styles of the results 114 creating additional data characterizing the styles of the results, allowing for searches to be performed to identify results of a particular style (or with some other feature). Performing the search 130 results in additional results 131 being displayed in the user interface 104 (or alternatively being displayed as part of the results 114). In the example illustrated above, results in the results 114 having Baroque styling, or seeming to have Baroque styling, as identified by application of the AI model 120, will be displayed in the results 131.

Figure 3:
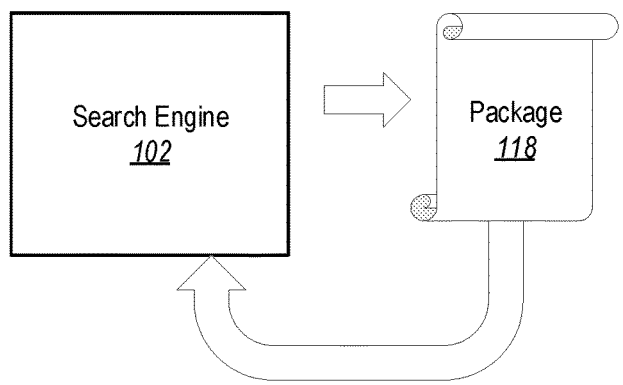
FIG. 3 illustrates a search engine being used to create an executable search package, and consuming the executable search package.

FIG. 2 further illustrates an export button 132 in the user interface 104. When a user selects the export button 132, the search engine will export information about the search to create an executable package that is executable by a search engine to allow a different user (or even the same user if so desired) to employ the search strategies and AI model selections implemented by the user. In particular, FIG. 3 illustrates an example where the search engine 102 exports the package 118 that is executable by search engines. For example, the package may include the original search entered into the search box 108, along with at least identification of the AI model 120, and potentially executable code for the AI model 120 itself, selected by the user, and the search 130 entered by the user. For example, this can allow a different user to apply the package 118 as illustrated in FIG. 3 to the search engine 102 to obtain the same results as the first user.

Note that while in the original example, the search entered into the search box 108, the AI model 120, and the search 130 are included in the package 118, in other embodiments the user and/or the search engine 102 may select which items to include in the package 118. For example, in some embodiments the package may only include identification of the AI model 120 and the search 130. This allows another user, or even the first user, to perform a search in the search box 108 that is different than the original search but that is able to apply the AI model 120 and the search 130 to the different search results that would be obtained by performing a different search in the first instance.

Often a search engine 102 will be used by a number of different users each accessing the functionality of the search engine 102 from various different user interfaces displayed to the users. In some embodiments, the search engine 102 may present to various users the availability of various packages available for use by the users of the search engine.

For example, one can imagine that a novice or less skilled user may find the availability of the package 118 produced by searches performed by a well-known skilled searcher to be a technical benefit when performing searches. In particular, the search engine 102 may present various options to a user for selecting packages including identifying packages produced by well-known searchers when searching particular subject matter. The less experienced user can have these packages applied at the search engine 102 to allow the novice or less experienced user to obtain results similar in quality to those of a more experienced user. Thus, the user interface used by the less experienced user is able to display data that would not ordinarily be available to that user but for the availability of packages containing search parameters used by the more skilled searcher.

Figure 4:
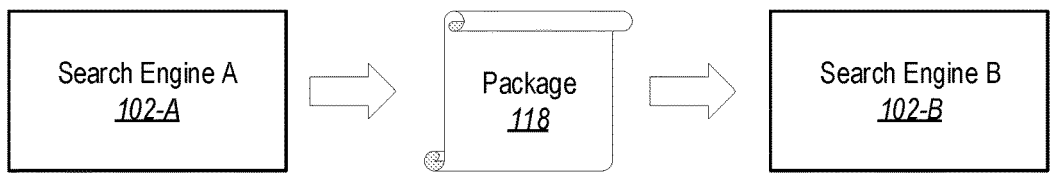
FIG. 4 illustrates where a first search engine creates an executable search package which is consumed by a second, different, search engine.

Note that while the example in FIG. 3 illustrates that the package 118 is applied to the same search engine 102 which created the package 118, in other embodiments the package 118 can be exported for use with different search engines. For example, FIG. 4 illustrates an example worried search engine 102-A creates a package 118 and exports the package 118 for use by other search engines. In the example illustrated in FIG. 4, the search engine 102-B consumes the package 118 and executes the package 118 at the search engine 102-B allowing a user at the search engine 102-B to perform searches using parameters, including applying AI models, used by other searchers to allow searchers at the search engine 102-B to achieve similar results to the other searchers.

Figure 5:
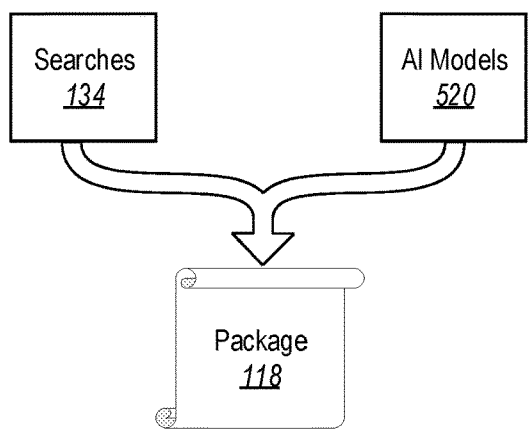
FIG. 5 illustrates creation of an executable search package.

Referring now to FIG. 5, a generalized approach is illustrated for creating the package 118. In the example illustrated in FIG. 5, various combination of searches 134 (which may include the searches entered into the search box 108 and the searches 130) and AI models 520 are identified and packaged as an executable package 118. Note that typically, the package 118 will include some type of ordering. For example, the package 118 may identify the order in which searches and application of AI models are performed. For example, a search may be performed resulting in certain results. One or more AI models may be applied for those results. Thus, the package 118 will identify this order of searching followed by application of AI models to results from the search. As explained in more detail above, application of AI models results in yet additional data that can be searched. Thus, additional searches are performed on these additional available results. The package 118 includes logic to identify that this additional searching is performed after the application of the AI models. Note that various iterations of this can occur with new AI models being applied to new results as appropriate. Thus, an appropriate chain of searches, AI model applications, additional searches, etc. may be performed and documented as executable code able to replicate the actions, when executed, in the package 118.

Figure 6:
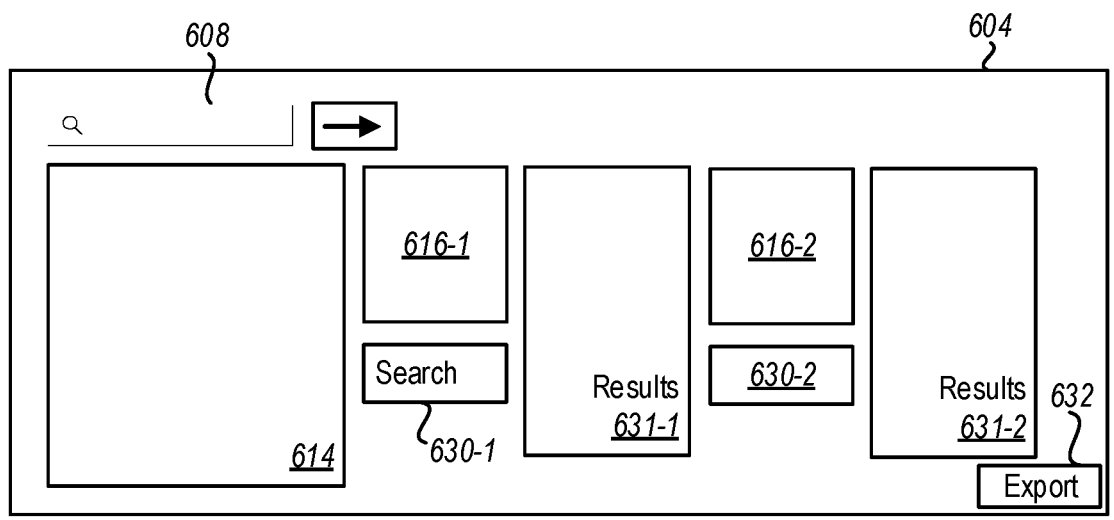
FIG. 6 illustrates a user interface for creating a package that includes a series of AI models and searches.

Referring now to FIG. 6, an example of a user interface 604 where chains of AI models and searching is performed is illustrated. FIG. 6 illustrates a search box 608. The user can enter search parameters in the search box 608. As noted above, the search parameters may include search terms, operators, filters, or other search parameters. Executing the search on a search engine will result in results 614 being displayed to the user in the user interface 604. The user can then apply an AI model using the AI model selection element 616-1. As illustrated above, the AI model will generate additional data, based on the results 614, that can be searched. Performing a search 630-1 will produce additional results 631-1. An additional AI model could then be applied using the AI model selection element 616-2 which will be applied to the results 631-1 and/or potentially the results 614 to create yet additional data that can be searched by the search engine. Note that the application of AI models can be configured to apply to the most recent set of results (i.e., results 631-1), previously obtained results (e.g., results 614), and/or a combination thereof. A created package such as the package 118 will be configured to apply AI models as specified and applied.

Again, as illustrated in the example in FIG. 6, an additional search 630-1 can be performed producing results 631-2 that can be displayed to the user in the user interface 604. Note that as illustrated by the ellipses this process can be continued as desired by the original searcher. Thus, chains of application of AI models and searches can be performed and documented to produce a package 118 that can be executed by a search engine to accomplish similar functionality and results as in a search session in a first instance.

As noted previously, when exporting a package the user may choose to include and/or exclude certain searches and/or certain AI models. For example, certain searches and/or certain AI models may be peripheral to search goals of a searcher thus may be excluded from export into executable packages. For example, a user can use user interface selection tools such as checkboxes, highlighting, or other selection tools to select searches and/or models to export. Alternatively or additionally, the user may select, using certain user interface selection tools such as highlighting, checkboxes, or other tools to select which AI models and/or searches to exclude from a package. In one particular example, embodiments may exclude the original search(es) included in the search box 608 but may include the application of AI models applied using the elements 616-1, 616-2, through whatever other AI models are applied along with search 630-1, search 630-2, and whatever other searches are applied (while excluding the original search entered into the search box 608).

This allows a user to apply given search techniques to a different set of data than was originally searched in the first instance. For example, consider a case where the first search input at the search box 608 was a search on horses. The subsequent AI models are applied and searches performed may have been directed to identifying search results indicating certain diseases and/or other medical conditions in horses. A different searcher who is interested in studying cattle may wish to apply similar identification techniques as were used for horses to cattle. This allows the subsequent searcher to perform a search in the search box 608 related to cattle, but to apply the AI models and additional searching that were originally performed for horses to the cattle results obtained in the results for cattle, simply by applying an executable package at a search engine to have the AI models and additional searching applied to cattle instead of horses.

Figure 7:
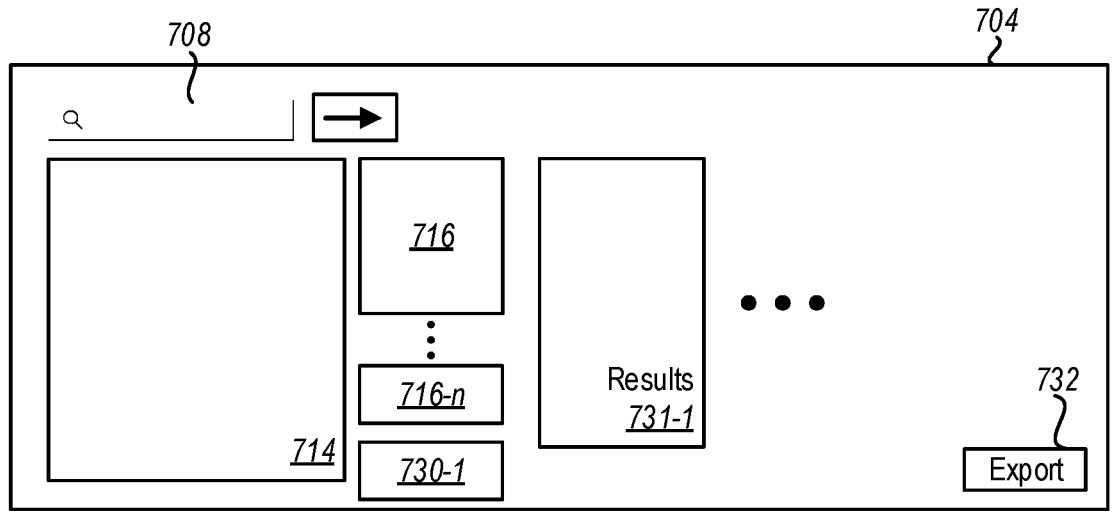
FIG. 7 illustrates a user interface for creating a package that includes a set of AI models applied in parallel.

Referring now to FIG. 7, an alternative or additional embodiment is illustrated. In this example, a user can enter search parameters in the search box 708 which results in the results 714. In this example, AI models may be applied together. For example, the searcher may determine to add a plurality of AI models illustrated at AI model 716-1 through AI model 716-n to the user interface 702 to cause these models to be applied to the results 714. An additional search 710-1 can be performed on the additional data produced by applying the AI models, each represented by the AI model selection elements 716-1 through 716-n to produce the results 731-1. As illustrated by the additional ellipses following the results 731-1, this can be repeated as appropriate adding additional AI models and/or sets of AI models and performing additional searching in a fashion similar to that illustrated in FIG. 6. Once the user has obtained a satisfactory search the user can select the export button 732 to export term searches and/or AI models into a package which can be executed by a subsequent searcher (or the same searcher) at a same or different search engine as appropriate. Again, as noted above, certain AI models and/or searches can be excluded from being included in the package.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 8:
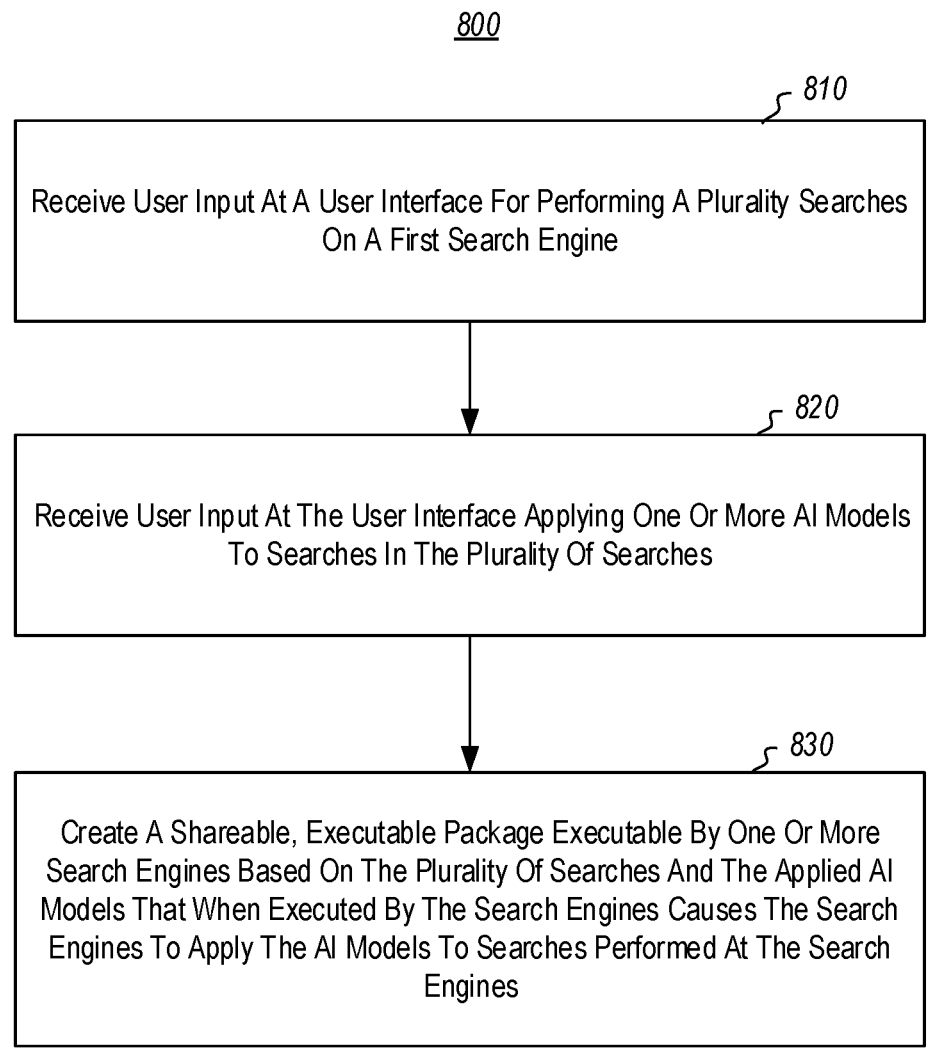
FIG. 8 illustrates a method of performing collaborative search engine searching.

Referring now to FIG. 8, a method 800 is illustrated. The method 800 includes acts for performing collaborative search engine searching. The method includes receiving user input at a user interface for performing a plurality searches on a first search engine (act 810). For example, a user may enter one or more searches in the search box 108 illustrated in FIG. 1.

The method further includes receiving user input at the user interface applying one or more AI models to searches in the plurality of searches (act 820). For example, a user may indicate AI models to be applied using the AI model selection element 116 illustrated in FIG. 1.

The method further includes creating a shareable, executable package executable by one or more search engines based on the plurality of searches and the applied AI models that when executed by the search engines causes the search engines to apply the AI models to searches performed at the search engines (act 830). For example, embodiments may create the package 118 illustrated in FIG. 1.

The method 800 may be practiced where creating the package comprises creating an order for performing searches and applying the AI models.

The method may further include sharing the package with other users of a search engine that created the package. An example of this is illustrated in FIG. 3.

The method 800, may further include sharing the package to a package store accessible by a plurality of search engines. For example, in FIG. 4, the search engine 102-B may obtain the package 118 from a store, such as an app store.

The method 800 may be practiced where creating a shareable, executable package is performed as a result of a user selecting a user interface element to export AI models and searches performed during a search session. For example, the export button 132 may be used to cause the package to be created.

The method 800 may further include receiving user input selecting a subset of AI models and searches used during a search session. In this example, wherein creating a shareable, executable package is performed by creating a package that includes the selected subset of AI models and searches used during the search session while excluding other AI models and searches used during the search session. Thus, as illustrated above, not all searches and AI models used in a search session need to be exported into the package 118.

The method 800 may be practiced where the shareable, executable package is created based on a search for a first subject matter with AI models applied to the first subject matter but created so as to be executable to apply the AI models to a second, different subject matter. In the example illustrated above, the package may be created while searching for information related to horses, while the package may be later used to perform searches for cows.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer-readable media having stored thereon instructions that are executable by the one or more processors to configure the computer system to perform collaborative search engine searching, including instructions that are executable to configure the computer system to perform at least the following:
   receiving user input at a user interface for performing a first search on a first search engine to create first search results;
   receiving additional user input at the user interface selecting one or more augmentation AI models, that, as a result of selection, are applied to the first search results, wherein application of the one or more augmentation AI models causes creation of additional data that is searchable by the first search engine;
   subsequent to the first search being performed on the first search engine and the one or more augmentation AI models being applied thereby causing creation of the additional data, receiving user input at the user interface for performing a second search on the first search engine, the second search being performed by the first search engine over at least the additional data;

receiving input indicating that at least the one or more augmentation AI models and second search are to be exported; and as a result, creating a shareable, executable package subsequently executable by one or more search engines that is executable by the one or more search engines causing the one or more search engines to apply at least the one or more augmentation AI models and the second search to searches performed at the one or more search engines.

2. The computer system of claim 1, wherein creating the package comprises creating an order for performing a plurality of searches and applying a plurality of AI models.

3. The computer system of claim 1, wherein the one or more computer-readable media further have stored thereon instructions that are executable by the one or more processors to configure the computer system to share the package with other users of a search engine that created the package.

4. The computer system of claim 1, wherein the one or more computer-readable media further have stored thereon instructions that are executable by the one or more processors to configure the computer system to share the package to a package store accessible by the one or more search engines.

5. The computer system of claim 1, wherein creating a shareable, executable package is performed as a result of a user selecting a user interface element to export AI models and searches performed during a search session.

6. The computer system of claim 1, wherein the one or more computer-readable media further have stored thereon instructions that are executable by the one or more processors to configure the computer system to receive user input selecting a subset of AI models and searches used during a search session, and wherein creating a shareable, executable package is performed by creating a package that includes the selected subset of AI models and searches used during the search session while excluding other AI models and searches used during the search session.

7. The computer system of claim 1, wherein the shareable, executable package is created based on a search for a first subject matter with AI models applied to the first subject matter but configured to execute to apply the AI models to a second, different subject matter.

8. A method of performing collaborative search engine searching, the method comprising:

receiving user input at a user interface for performing a first search on a first search engine to create first search results;

receiving additional user input at the user interface selecting one or more augmentation AI models, that, as a result of selection, are applied to the first search results, wherein application of the one or more augmentation AI models causes creation of additional data that is searchable by the first search engine;

subsequent to the first search being performed on the first search engine and the one or more augmentation AI models being applied thereby causing creation of the additional data, receiving user input at the user interface for performing a second search on the first search engine, the second search being performed by the first search engine over at least the additional data;

receiving input indicating that at least the one or more augmentation AI models and second search are to be exported; and as a result, creating a shareable, executable package subsequently executable by one or more search engines that is executable by the one or more search engines causing the one or more search engines to apply at least the one or more augmentation AI models and the second search to searches performed at the one or more-search engines.

9. The method of claim 8, wherein creating the package comprises creating an order for performing a plurality of searches and applying a plurality of AI models.

10. The method of claim 8, further comprising sharing the package with other users of a search engine that created the package.

11. The method of claim 8, further comprising sharing the package to a package store accessible by the one or more search engines.

12. The method of claim 8, wherein creating a shareable, executable package is performed as a result of a user selecting a user interface element to export AI models and searches performed during a search session.

13. The method of claim 8, further comprising receiving user input selecting a subset of AI models and searches used during a search session, and wherein creating a shareable, executable package is performed by creating a package that includes the selected subset of AI models and searches used during the search session while excluding other AI models and searches used during the search session.

14. The method of claim 8, wherein the shareable, executable package is created based on a search for a first subject matter with AI models applied to the first subject matter but configured to execute to apply the AI models to a second, different subject matter.

15. One or more physical computer-readable storage media having stored thereon instructions that are executable by one or more processors, and when executed by the one or more processors configure a computer system to perform collaborative search engine searching, by configuring the computer system to perform at least the following:

receiving user input at a user interface for performing a first search on a first search engine to create first search results;

receiving additional user input at the user interface selecting one or more augmentation AI models, that, as a result of selection, are applied to the first search results, wherein application of the one or more augmentation AI models causes creation of additional data that is searchable by the first search engine;

subsequent to the first search being performed on the first search engine and the one or more augmentation AI models being applied thereby causing creation of the additional data, receiving user input at the user interface for performing a second search on the first search engine, the second search being performed by the first search engine over at least the additional data;

receiving input indicating that at least the one or more augmentation AI models and second search are to be exported; and as a result, creating a shareable, executable package subsequently executable by one or more search engines that is executable by the one or more search engines causing the one or more search engines to apply at least the one or more augmentation AI models and the second search to searches performed at the one or more search engines.

16. The one or more physical computer-readable storage media of claim 15, wherein creating the package comprises creating an order for performing a plurality of searches and applying a plurality of AI models.

17. The one or more physical computer-readable storage media of claim 15, further comprising instructions that are executable by the one or more processors to configure the computer system to share the package with other users of a search engine that created the package.

18. The one or more physical computer-readable storage media of claim 15, wherein creating a shareable, executable package is performed as a result of a user selecting a user interface element to export AI models and searches performed during a search session.

19. The one or more physical computer-readable storage media of claim 15, further comprising instructions that are executable by the one or more processors to configure the computer system to receive user input selecting a subset of AI models and searches used during a search session, and wherein creating a shareable, executable package is performed by creating a package that includes the selected subset of AI models and searches used during the search session while excluding other AI models and searches used during the search session.

20. The one or more physical computer-readable storage media of claim 15, wherein the shareable, executable package is created based on a search for a first subject matter with AI models applied to the first subject matter but configured to execute to apply the AI models to a second, different subject matter.

* * * * *